(12) United States Patent
Haberland

(10) Patent No.: US 7,345,769 B2
(45) Date of Patent: Mar. 18, 2008

(54) LOAD DEPENDENT ANALYZING OPTICAL COMPONENTS

(75) Inventor: Udo Haberland, Holzgerlingen (DE)

(73) Assignee: Agilent Technologies Inc., Santa Clara, CA (US)

( * ) Notice: Subject to any disclaimer, the term of this patent is extended or adjusted under 35 U.S.C. 154(b) by 318 days.

(21) Appl. No.: 10/532,448

(22) PCT Filed: Oct. 26, 2002

(86) PCT No.: PCT/EP02/11993

§ 371 (c)(1),
(2), (4) Date: Apr. 22, 2005

(87) PCT Pub. No.: WO2004/038359

PCT Pub. Date: May 6, 2004

(65) Prior Publication Data

US 2005/0286057 A1    Dec. 29, 2005

(51) Int. Cl.
*G01B 9/02* (2006.01)

(52) U.S. Cl. ............ 356/450; 356/73.1; 356/491

(58) Field of Classification Search ......... 356/73.1, 356/450, 451, 477, 481, 484, 491, 517
See application file for complete search history.

(56) References Cited

U.S. PATENT DOCUMENTS 5,528,367 A * 6/1996 Putnam et al. ............. 356/480
6,212,003 B1    4/2001 Komazawa et al.
6,977,720 B2 * 12/2005 Baney et al. .............. 356/73.1

FOREIGN PATENT DOCUMENTS

| EP | 0 280 329 | 8/1988 |
| EP | 1 018 642 | 7/2000 |
| EP | 1 148 664 | 10/2001 |

OTHER PUBLICATIONS

Fleming S C et al., "Measurement of Pump Induced Refractive Index Change in Erbium Doped Fibre Amplifier", Electronics Letters, IEE Stevanage, GB, vol. 27, No. 21, Oct. 10, 1991, pp. 1959-1961.

* cited by examiner

*Primary Examiner*—Hwa (Andrew) Lee

(57) ABSTRACT

The present invention relates to an apparatus and to a method of load dependent analyzing an optical component (114), comprising the steps of: splitting an initial signal (115) into the reference signal (115b) into and into a measurement signal (115a), intermittently providing a load signal (108) to the component (114), providing the measurement signal (115a), to the component (114), so that the component (114) can influence the measurement signal (115a) to create a signal (120) influenced by and received from the component (114), superimposing the reference signal with the signal (120) received from the component (114), to provide a superimposed signal (118), detecting the superimposed signal (118) when the loading signal (108) is not present at the component (114) to provide an information containing signal (126), and processing the information containing signal (126) to determine an optical property of the component (114) dependent on a property of the load signal (118).

20 Claims, 1 Drawing Sheet

LOAD DEPENDENT ANALYZING OPTICAL COMPONENTS

BACKGROUND OF THE INVENTION

The present invention relates to load dependent analyzing optical components, in particular to interferometric phase measurement of passive and active optical components.

Optical networks operating at highest bit-rates, e.g. 40 Gb/s, impose increasingly stronger requirements on the dispersion properties of all involved network elements. This implies that passive and active optical components or devices need to be characterized, in particular in terms of group delay and differential group delay. Active components can be optical fiber amplifiers, such as erbium doped fiber amplifiers (EDFA), TDFA, OFA, optical wave guide amplifiers, such as EDWA, semi-conductor amplifiers, such as SOA, and hybrid devices. Major component parameters of active devices are gain and noise figure. These parameters can be measured by indirect principles such as time-domain extinction method, signal substitution and interpolation with signal subtraction and other direct principles such as dynamic gain and noise gain profile. Passive optical devices and their dispersion relevant phase properties can be measured by modulation phase shift methods, differential phase shift methods and interferometric methods.

SUMMARY OF THE INVENTION

It is an object of the invention to provide improved load dependent analyzing optical components, in particular to interferometric phase measurement of passive and active optical components. The object is solved by the independent claims. Preferred embodiments are shown by the dependent claims.

Generally, interferometric methods used to obtain the phase properties of passive optical devices rely on the interference of a chirped laser light with its delayed signal. The present invention comprises the perception that active components to be characterized by such interferometric methods must be loaded by a set of sources spaced in optical frequency. However, these loading sources interfere with the chirped laser in such a way, that phase properties of an active component can only be determined with significantly reduced accuracy. Advantageously, embodiments of the present invention allow for measuring the phase properties of active devices in the presence of loading sources without the aforementioned backlogs. Moreover, embodiments of the present invention provide the ability of measurements of group delay and differential group delay of active devices under load without a significantly reduced accuracy due to interference of the loading sources with the chirped probing laser signal.

Additionally, according to embodiments of the present invention the same interferometric measurement setup can be used for phase measurements, for gain and noise figure measurements, and for gain tilt and polarization dependent gain measurements, also. Therefore, embodiments of the present invention provide for a combined setup for loss, phase, gain and noise figure measurements.

The invention can be partly embodied or supported by one or more suitable software programs, which can be stored on or otherwise provided by any kind of data carrier, and which might be executed in or by any suitable data processing unit. Software programs or routines are preferably applied to the realization of the inventive method.

BRIEF DESCRIPTION OF THE DRAWING

Other objects and many of the attendant advantages of the present invention will be readily appreciated and become better understood by reference to the following detailed description when considering in connection with the accompanied drawing. The components in the drawing are not necessarily to scale, emphasis instead being placed upon clearly illustrating the principles of the present invention. Features that are substantially or functionally equal or similar will be referred to with the same reference sign(s).

DETAILED DESCRIPTION OF PREFERRED EMBODIMENTS OF THE INVENTION

Figure 1:
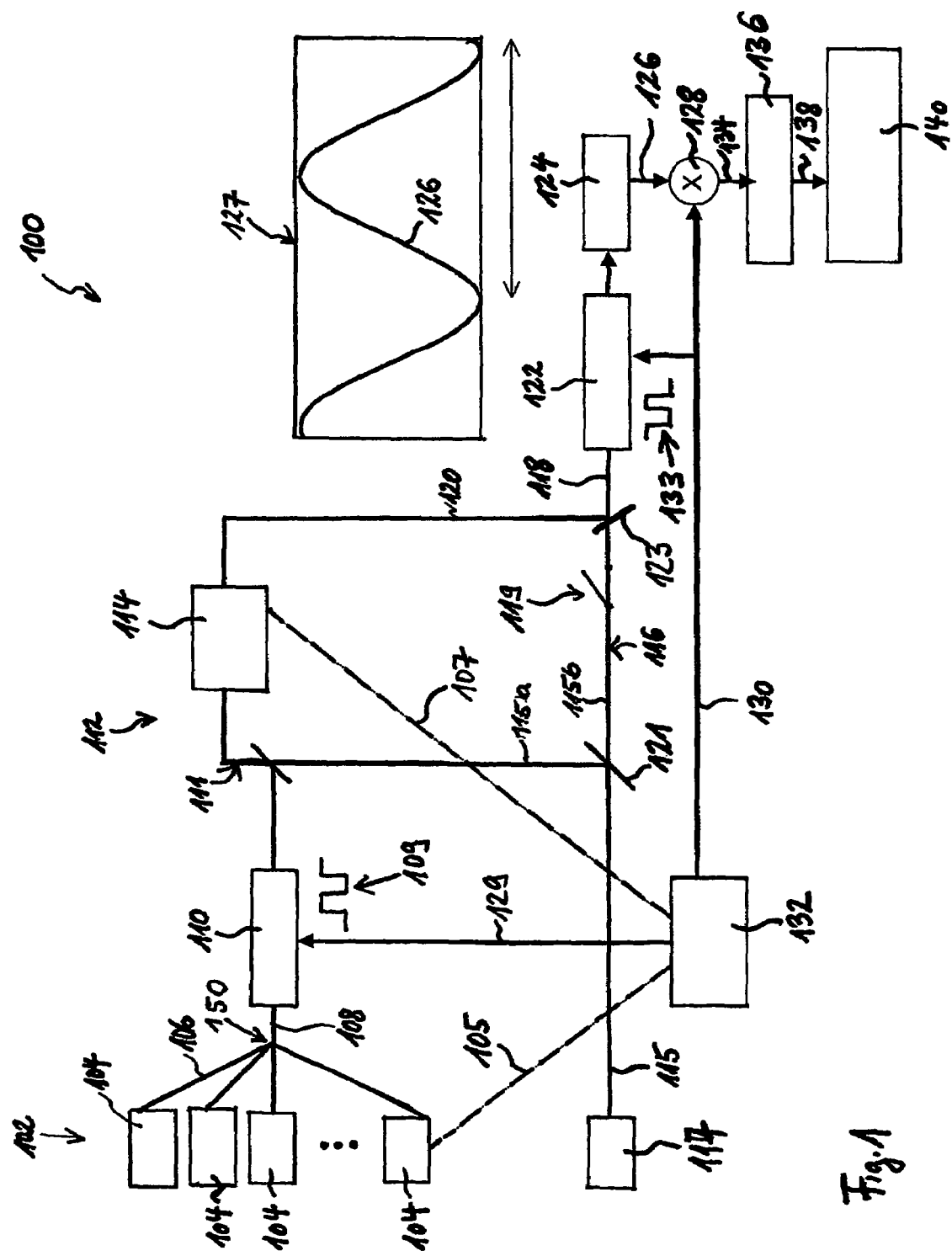
FIG. 1 shows a schematic illustration of an embodiment of the present invention.

Referring now in greater detail to the drawing, FIG. 1 shows a setup 100 according to an embodiment of the present invention. Setup 100 comprises a bank 102 of sources 104 providing optical signals 106 which signals 106 are combined by a coupler 150 to a resulting signal 108. Sources 104 can be distributed feedback laser sources. Resulting signal 108 is amplitude modulated with a modulation frequency 109 by an external modulator 110 controlled via connecting line 129 by a radio frequency (RF) signal source 132. Signal 108 is then added to a measurement arm 111 of an interferometric 112 as a load signal for a device undertest (DUT) 114 as a transmittive component to be analyzed in a measurement arm 111.

The DUT 114 can be an amplifier, e.g. an EDFA. The amplitude of the load signal 108 should be strong enough to induce a change of the load dependent properties of the DUT 114. Preferably, the load signal 108 should induce a saturation of the DUT 114. The other arm 116 of the interferometer 112 is a reference arm 116 of the interferometer 112.

Alternatively, the loading sources 104 can be modulated directly according to dotted line 105 or the DUT 114 can be modulated directly according to dotted line 107 if a loading source or a combination of loading sources together with a coupler is part of DUT 114.

Tuned laser light 115 provided by a chirped tunable laser source 117 is applied to the interferometer 112, also. The laser light 115 is split by a beam splitter 121 into a part 115a traveling through the measurement arm 111 in which it is delayed by DUT 114 and into a part 115b traveling through the reference arm 116. A delayed signal 120 is then superimposed with the undelayed part 115b of signal 115 by a beam splitter 123 to create a resulting interferometer signal 118.

Without the load 108, the interferometer signal 118 is determined by the interference of the laser signal 115b with its delayed signal 120. Typical frequencies of the interferometer signal 118 are up to 500 kHz, e.g. in the range of 100 kHz-500 kHz. The modulation frequency 109 of modulator 110 should be significantly higher than the maximum interference signal 118 obtained without the load 108. A modulation frequency 109 of >5 MHz is feasible.

A demodulator 122 controlled via connecting line 130 by the RF signal source 132 and receiving interference signal 118 passes the interferometer signal 118 to a receiver 124 at those times according to demodulation frequency 133, where the modulator 110 switches the loading light 108 off. The load dependent optical properties of the DUT 114 have a time constant that is larger than the off-period of the modulator 110. In other words: the modulation frequency 109 is chosen much higher than the frequency with which the load dependent optical properties of the DUT 114 are expected to oscillate. Therefore, optical properties of DUT 114 can be measured during the off-period of the modulator 110 without interference of laser light 115 of tunable laser source 117 with the load signals 108.

A signal 126 of the receiver 124 is then down-converted using classical heterodyne mixing by a mixer 128 into an interference frequency range used at no load operation of setup 100. The modulated receiver signal 126 is displayed in a graph 127.

Receiver signal 126 is mixed with signal 130 of the RF signal source 132 in mixer 128. The resulting mixed signal 134 is provided to a low-pass filter 136 and the low-passed filtered signal 138 is then provided to a signal processing unit 140 to evaluate group delay, differential group delay, gain and/or noise figure of DUT 114. In an alternative embodiment mixer 128 and low pass filter 136 can be replaced by a high-speed digital receiving unit.

In reference arm 116 there can be integrated a switch 119 to simulate a non-interferometric time domain extinction method measurement of DUT 114, also.

The invention claimed is:

1. A method comprising:
providing a load signal to an optical component, wherein the load signal is periodic, and has a period having a time interval during which the load signal is present at the optical component, and a time interval during which the load signal is not present;
providing a measurement signal to the optical component to create a component signal influenced by the optical component;
superimposing a reference signal with the component signal to provide a superimposed signal;
detecting the superimposed signal when the load signal is not present at the optical component, to provide an information containing signal; and
processing the information containing signal to determine an optical property of the optical component dependent on a property of the load signal.

2. The method of claim 1, wherein the load signal is composed of at least two loading signals spaced in optical frequency.

3. The method of claim 2, wherein the providing of the load signal comprises a technique selected from the group consisting of switching the two loading signals on and off, and modulating the load signal.

4. The method of claim 1, further comprising:
controlling the provision of the load signal by a controlling signal; and
mixing the controlling signal with the information containing signal.

5. The method of claim 1, further comprising:
band pass filtering the information containing signal before the processing of the information containing signal.

6. The method of claim 1, further comprising:
at least temporarily switching off the reference signal to detect solely a signal from the optical component; and
performing a time domain extinction measurement of the optical component.

7. The method of claim 1 wherein the optical property is selected from the group consisting of group delay, differential group delay, loss, gain, noise figure, gain tilt, and polarization dependent gain.

8. The method of claim 1, wherein the time interval during which the load signal is not present is less than a time constant of a load dependent optical property of the optical component.

9. An apparatus comprising:
(a) interferometer comprising:
a reference arm to receive a reference signal; and
a measurement arm to receive a measurement signal and for providing the measurement signal to an optical component to create a signal influenced by the optical component;
(b) a load source for providing a load signal to the optical component, wherein the load signal is periodic and has a period having a time interval during which the load signal is present at the optical component, and a time interval during which the load signal is not present at the optical component;
(c) a first beam splitter at a junction of a beginning of the reference arm and a beginning of the measurement arm, for splitting an initial signal into the reference signal and the measurement signal;
(d) a second beam splitter at an a junction of an end of the reference arm and a line from an output of the optical component, for superimposing the reference signal with a signal received from the optical component, to provide a superimposed signal;
(e) a detector for detecting the superimposed signal when the load signal is not present at the optical component, to provide an information containing signal, and
(f) a signal processor for processing the information containing signal to determine an optical property of the optical component.

10. The apparatus of claim 9, wherein the load source comprises a load bank composed of at least two loading sources for composing the load signal by at least two loading signals spaced in optical frequency.

11. The apparatus of claim 9,
wherein the the load source comprises at least two loading sources for composing the load signal (108) by at least two loading signals spaced in optical frequency, and further comprising a device selected from the group consisting of:
a modulator for modulating the load signal, and a switch for switching the load source on and off.

12. The apparatus of claim 9, further comprising:
an RF source for controlling the provision of the load signal by a controlling signal; and
a mixer for mixing the controlling signal with the information containing signal.

13. The apparatus of claim 9, further comprising:
a band pass filter for extracting the information containing signal before the processing of the information containing signal.

14. The apparatus of claim 9, wherein the switch is a first switch, and wherein the apparatus further comprises:
a second switch for at least temporarily switching off the reference signal to detect solely the signal received from the optical component, to facilitate a time domain extinction measurement of the optical component.

15. The apparatus of claim 9, wherein the optical property is selected from the group consisting of group delay, differential group delay, loss, gain, noise figure, gain tilt, and polarization dependent gain.

16. The apparatus of claim 9, wherein the time interval during which the load signal is not present is less than a time constant of a load dependent optical property of the optical component.

17. The apparatus of claim 9, further comprising a demodulator that (a) receives the superimposed signal, and a signal from the load source that indicates when the load signal is not present at the optical component, and (b) passes the superimposed signal to the detector when the signal from the load source indicates that the load signal is not present at the optical component.

18. An apparatus, comprising:
a first signal source for providing a load signal to an optical component, wherein the load signal is periodic and has a period having a time interval during which the load signal is present at the optical component, and a time interval during which the load signal is not present;
a second signal source for providing a measurement signal to the optical component, to create a component signal influenced by the optical component;
a reference signal source for providing a reference signal;
a detector for detecting, when the load signal is not present at the optical component, a superimposed signal that results from a superimposition of the reference signal and the component signal, and for providing therefrom an information containing signal; and
a processing unit for processing the information containing signal to determine an optical property of the optical component dependent on a property of the load signal.

19. The apparatus of claim 18, wherein the time interval during which the load signal is not present is less than a time constant of a load dependent optical property of the optical component.

20. The apparatus of claim 18, further comprising a demodulator that (a) receives the superimposed signal, and a signal from the first signal source that indicates when the load signal is not present at the optical component, and (b) passes the superimposed signal to the detector when the signal from the load source indicates that the load signal is not present at the optical component.

* * * * *